United States Patent
Washnock et al.

(10) Patent No.: US 10,822,020 B2
(45) Date of Patent: Nov. 3, 2020

(54) VEHICLE STEERING

(71) Applicant: Ford Global Technologies, LLC, Dearborn, MI (US)

(72) Inventors: Joseph Washnock, Canton, MI (US); Jack E. Barry, Dearborn, MI (US); Soungjin Wou, Novi, MI (US); Garry Robert Smith, Grosse Pointe Park, MI (US); Jennifer Laz, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 16/057,971

(22) Filed: Aug. 8, 2018

(65) Prior Publication Data

US 2020/0047792 A1    Feb. 13, 2020

(51) Int. Cl.
| | | |
|---|---|---|
| *B62D 5/04* | (2006.01) | |
| *F16H 19/04* | (2006.01) | |
| *F16H 1/20* | (2006.01) | |
| *B62D 3/12* | (2006.01) | |

(52) U.S. Cl.
CPC .......... *B62D 5/0442* (2013.01); *B62D 3/123* (2013.01); *B62D 5/0403* (2013.01); *B62D 5/0421* (2013.01); *B62D 5/0463* (2013.01); *F16H 1/206* (2013.01); *F16H 19/04* (2013.01)

(58) Field of Classification Search
CPC .. B62D 5/0442; B62D 5/0403; B62D 5/0421; B62D 5/0463; F16H 1/206; F16H 19/04
USPC ............................. 180/443, 444, 446
See application file for complete search history.

(56) References Cited

U.S. PATENT DOCUMENTS

| | | | |
|---|---|---|---|
| 6,481,526 B1 | 11/2002 | Millsap et al. | |
| 2003/0006087 A1* | 1/2003 | Sahr ................. | B62D 5/083 180/441 |
| 2005/0087390 A1* | 4/2005 | Furumi ............... | B62D 5/04 180/446 |
| 2014/0109702 A1* | 4/2014 | Kometani ........... | B62D 5/0421 74/30 |
| 2017/0291633 A1 | 10/2017 | Oh | |
| 2018/0015946 A1* | 1/2018 | Kodera ............... | B62D 5/043 |
| 2018/0201304 A1* | 7/2018 | Miyoshi ............. | B62D 5/0403 |
| 2020/0047793 A1* | 2/2020 | Washnock ........... | B62D 3/12 |

FOREIGN PATENT DOCUMENTS

| | | |
|---|---|---|
| DE | 102008009293 A1 | 8/2009 |
| EP | 2019021 A1 | 1/2009 |
| JP | 2004237785 A | 8/2004 |
| KR | 20160094019 A | 8/2016 |

* cited by examiner

*Primary Examiner* — Jacob D Knutson
(74) *Attorney, Agent, or Firm* — Ray Coppiellie; Hanley, Flight & Zimmerman, LLC (57) ABSTRACT

An assembly includes a steering rack. The assembly includes a first pinion meshed with the steering rack. The assembly includes an internal gear coupled to the first pinion. The assembly includes a second pinion meshed with the internal gear.

18 Claims, 7 Drawing Sheets

VEHICLE STEERING

BACKGROUND

A steering assembly controls a steering angle of wheels of a vehicle. The steering assembly may include a steering wheel coupled to a rack and pinion assembly designed to control the steering angle. The steering assembly may include an electric motor coupled to the rack and pinion assembly.

DETAILED DESCRIPTION

An assembly includes a steering rack. The assembly includes a first pinion meshed with the steering rack. The assembly includes an internal gear coupled to the first pinion. The assembly includes a second pinion meshed with the internal gear.

The first pinion may be fixed relative to the internal gear.

The first pinion and the internal gear may be monolithic.

The assembly may include a motor engaged with the first pinion.

The assembly may include a yoke operatively engaging the steering rack opposite the first pinion, and a spring urging the yoke toward the steering rack and the first pinion.

The assembly may include a housing supporting the steering rack, the first pinion, the internal gear, and the second pinion.

The assembly may include a second internal gear coupled to the second pinion, and a third pinion meshed with the second internal gear.

The second pinion and the second internal gear may be monolithic.

The assembly may include a yoke operatively engaging the second pinion, and a spring urging the yoke toward the second pinion opposite where the second pinion is meshed with the internal gear.

The assembly may include a circumferential surface between the second pinion and the second internal gear, the yoke abutting the circumferential surface.

The spring and the yoke may be designed to urge the second internal gear into mesh with the third pinion.

The assembly may include a housing supporting the steering rack, the first pinion, the internal gear, the second pinion, the second internal gear, and the third pinion.

The assembly may include a third pinion meshed with the steering rack.

A vehicle includes a pair of wheels. The vehicle includes a steering rack designed to control a steering angle of the wheels. The vehicle includes a first pinion meshed with the steering rack. The vehicle includes an internal gear coupled to the first pinion. The vehicle includes a second pinion meshed with the internal gear.

The internal gear may be above the steering rack.

The vehicle may include a steering wheel, a motor engaged with the first pinion, and a processor and a memory storing instructions executable by the processor to actuate the motor to control the steering angle of the wheels based on a detected position of the steering wheel.

The vehicle may include a third pinion meshed with the steering rack, and a steering wheel coupled to the third pinion.

The vehicle may include a second internal gear coupled to the second pinion, and a third pinion meshed with the second internal gear.

The vehicle may include a yoke operatively engaging the second pinion, and a spring urging the yoke toward the second pinion opposite where the second pinion is meshed with the internal gear.

The first pinion and the internal gear may be monolithic.

With reference to the Figures, wherein like numerals indicate like parts throughout the several views, a vehicle 20 includes a pair of wheels 22. The vehicle 20 includes a steering assembly 24 having a steering rack 26 designed to control a steering angle A of the wheels 22. The steering assembly 24 includes a first pinion 28 meshed with the steering rack 26. The steering assembly 24 includes a first internal gear 30 coupled to the first pinion 28. The steering assembly 24 includes a second pinion 32 meshed with the first internal gear 30. The adjectives "first," "second," etc., are used throughout this document as identifiers and are not intended to signify importance or order. The steering assembly 24 provides increased gear ratios for delivering higher torque to the steering rack 26 while decreasing packaging size of the steering assembly 24, e.g., as compared to traditional rack-and-pinion steering assemblies.

The vehicle 20 may be any passenger or commercial automobile such as a car, a truck, a sport utility vehicle, a crossover vehicle, a van, a minivan, a taxi, a bus, etc.

The wheels 22 of the vehicle 20 control a directing direction of the vehicle 20. A position of the wheels 22, e.g., turned to a right or a left relative to a forward driving direction, controls the driving direction, e.g., when the wheels 22 are turned to the right the vehicle 20 may be navigate to the right. The position of the wheels 22 defines the steering angle A, i.e., an amount of deviation of the wheels 22 to the right or left of center.

The steering assembly 24 controls the steering angle A of the wheels 22. The steering assembly 24 may be in communication with and receive input from a steering wheel 34 and a computer 36. The steering assembly 24 may be an electric power-assisted system, a steer-by-wire system, or other suitable system.

The steering wheel 34 allows an operator to steer the vehicle 20 by transmitting rotation of the steering wheel 34 to movement of the steering rack 26. The steering wheel 34 may be, e.g., a rigid ring fixedly attached to a steering column 38. The steering column 38 transfers rotation of the steering wheel 34 to movement of the steering rack 26. For example, a rotational position of the steering column 38 may be detected by the computer 36 of the vehicle 20, and the computer 36 may command a motor 40 to move the steering rack 26, e.g., in a steer-by-wire steering system. As another example, rotation of the steering column 38 may be coupled to the steering rack 26 such that torque from rotation of the steering column 38 is applied to the steering rack 26.

The steering rack 26 is designed to control the steering angle A of the wheels 22. For example, the steering rack 26 may be connected to the wheels 22 via tie-rods, steering knuckles, etc., and may be movable toward a right and a left of the vehicle 20. Movement of the steering rack 26 may change the steering angle A. The steering rack 26 may include a plurality of gear teeth 42 arranged along a length of the steering rack 26. The steering rack 26 may be slidably supported by a housing 44. For example, the steering rack 26 may slide within the housing 44 as the steering rack 26 moves to change the steering angle A.

The first pinion 28 includes a plurality of gear teeth 46. The gear teeth 46 extend outward, e.g., radially away from an axis A1 of the first pinion 28. The gear teeth 46 may be arranged circumferentially about the first pinion 28. The first pinion 28 may be rotatably supported by the housing 44 such that the first pinion 28 may rotate about the axis A1.

The first pinion 28 is meshed with the steering rack 26. In other words, the first pinion 28 is directly engaged with the steering rack 26, i.e., without intermediate components therebetween. The mesh between the first pinion 28 and the steering rack 26 transfers force from the first pinion 28 to the steering rack 26, e.g., such that rotation of the first pinion 28 causes movement of the steering rack 26, and vice versa. For example, the gear teeth 46 of the first pinion 28 may be meshed with the gear teeth 42 of the steering rack 26. Force may be transferred therebetween by the gear teeth 46 of the first pinion 28 contacting the gear teeth 42 of the steering rack 26.

The first internal gear 30 includes a plurality of gear teeth 48. The gear teeth 48 extend inwardly, e.g., radially toward an axis A2 of the first internal gear 30. The gear teeth 48 may be arranged circumferentially about the first internal gear 30, e.g., about the axis A2. The first internal gear 30 may be rotatably supported by the housing 44 such that the first internal gear 30 may rotate about the axis A2. The first internal gear 30 may be above the steering rack 26, e.g., relative to a top and bottom of the vehicle 20. The axis A2 of the first internal gear 30 and the axis A1 of the first pinion 28 may be aligned. To put it another way, the first internal gear 30 and the first pinion 28 may be co-axial.

The first internal gear 30 is coupled to the first pinion 28. Coupling the first pinion 28 to the first internal gear 30 transfers force therebetween. To put it another way, rotation of the first internal gear 30 causes rotation of the first pinion 28, and vice versa. For example, the first pinion 28 may be fixed relative to the first internal gear 30. In other words, the first pinion 28 and the internal gear 30 move together as a unit. For example, the first pinion 28 may be fixed to the first internal gear 30, e.g., via welding, etc. As another example, the first pinion 28 and the first internal gear 30 may be fixed to a common shaft. As one more example, the first pinion 28 and the first internal gear 30 may be monolithic, i.e., a single piece of material with no seams, joints, fasteners, or adhesives holding the first pinion 28 and the first internal gear 30 together.

The second pinion 32 includes a plurality of gear teeth 50. The gear teeth 50 extend outward, e.g., radially away from an axis A3 of the second pinion 32. The gear teeth 50 may be arranged circumferentially about the second pinion 32, e.g., about the axis A3. The second pinion 32 may be rotatably supported by the housing 44 such that the second pinion 32 may rotate about the axis A3.

The second pinion 32 is meshed with the first internal gear 30. In other words, the second pinion 32 is directly engaged with the first internal gear 30, i.e., without intermediate components therebetween. The mesh between the second pinion 32 and the first internal gear 30 transfers force from the second pinion 32 to the first internal gear 30, e.g., such that rotation of the second pinion 32 causes movement of the first internal gear 30, and vice versa. For example, the gear teeth 50 of the second pinion 32 may be meshed with the gear teeth 48 of the first internal gear 30. Force may be transferred therebetween by the gear teeth 50 of the second pinion 32 contacting the gear teeth 48 of the first internal gear 30.

The steering assembly 24 may include a second internal gear 52. The second internal gear 52 includes a plurality of gear teeth 54. The gear teeth 54 extend inwardly, e.g., radially toward an axis A4 of the second internal gear 52. The gear teeth 54 may be arranged circumferentially about the second internal gear 52, e.g., about the axis A4. The second internal gear 52 may be rotatably supported by the housing 44 such that the second internal gear 52 may rotate about the axis A4. The second internal gear 52 may be above the first internal gear 30, e.g., relative to the top and bottom of the vehicle 20. The axis A4 of the second internal gear 52 and the axis A3 of the second pinion 32 may be aligned. To put in another way, the second internal gear 52 and the second pinion 32 may be co-axial.

The second internal gear 52 may be coupled to the second pinion 32. For example, the second internal gear 52 may be fixed relative to the second pinion 32. In other words, the second internal gear 52 and the second pinion 32 move together as a unit. As another example, the second internal gear 52 may be fixed directly to the second pinion 32. As one more example, the second pinion 32 and the second internal gear 52 may be monolithic.

The steering assembly 24 may include a circumferential surface 56. The circumferential surface 56 aids in positioning the second pinion 32 and the second internal gear 52. The circumferential surface 56 is fixed relative to the second pinion 32 and the second internal gear 52. Force applied to the circumferential surface 56 is transferred to the second pinion 32 and the second internal gear 52. The circumferential surface 56 may be between the second pinion 32 and the second internal gear 52. The second pinion 32, the second internal gear 52, and the circumferential surface 56 may be monolithic.

The steering assembly 24 may include a third pinion 58. The third pinion 58 includes a plurality of gear teeth 60. The gear teeth 60 extend outward, e.g., radially away from an axis A5 of the third pinion 58. The gear teeth 60 may be arranged circumferentially about the third pinion 58, e.g., about the axis A5. The third pinion 58 may be rotatably supported by the housing 44 such that the third pinion 58 may rotate about the axis A5.

The third pinion 58 may be meshed with the second internal gear 52. In other words, the third pinion 58 is directly engaged with the second internal gear 52, i.e., without intermediate components therebetween. The mesh between the third pinion 58 and the second internal gear 52 transfers force from the third pinion 58 to the second internal gear 52, e.g., such that rotation of the third pinion 58 causes movement of the second internal gear 52, and vice versa. For example, the gear teeth 60 of the third pinion 58 may be meshed with the gear teeth 54 of the second internal gear 52. Force may be transferred therebetween by the gear teeth 60 of the third pinion 58 contacting the gear teeth 54 of the second internal gear 52.

Figure 1:
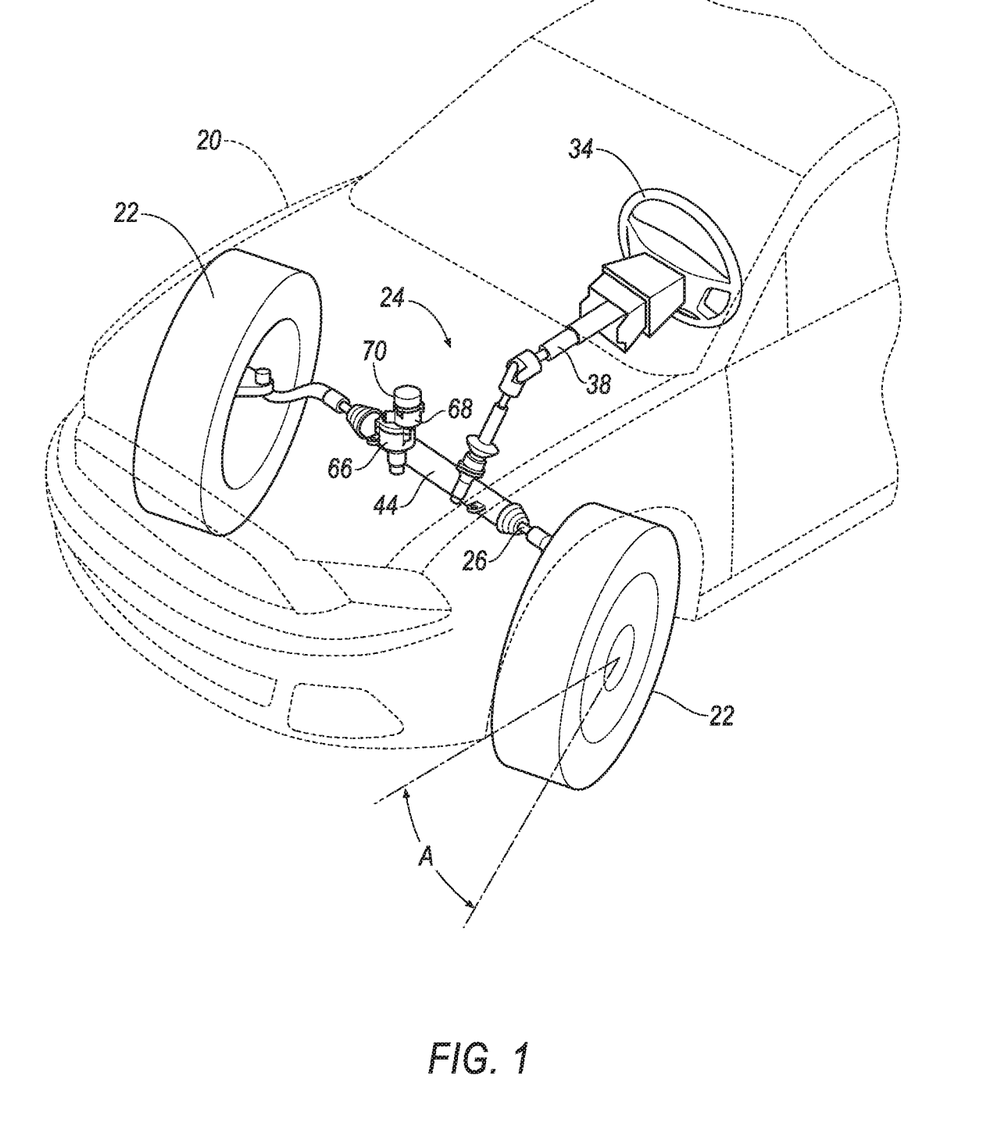
FIG. 1 is a perspective view of a vehicle having a steering assembly.
Figure 2:
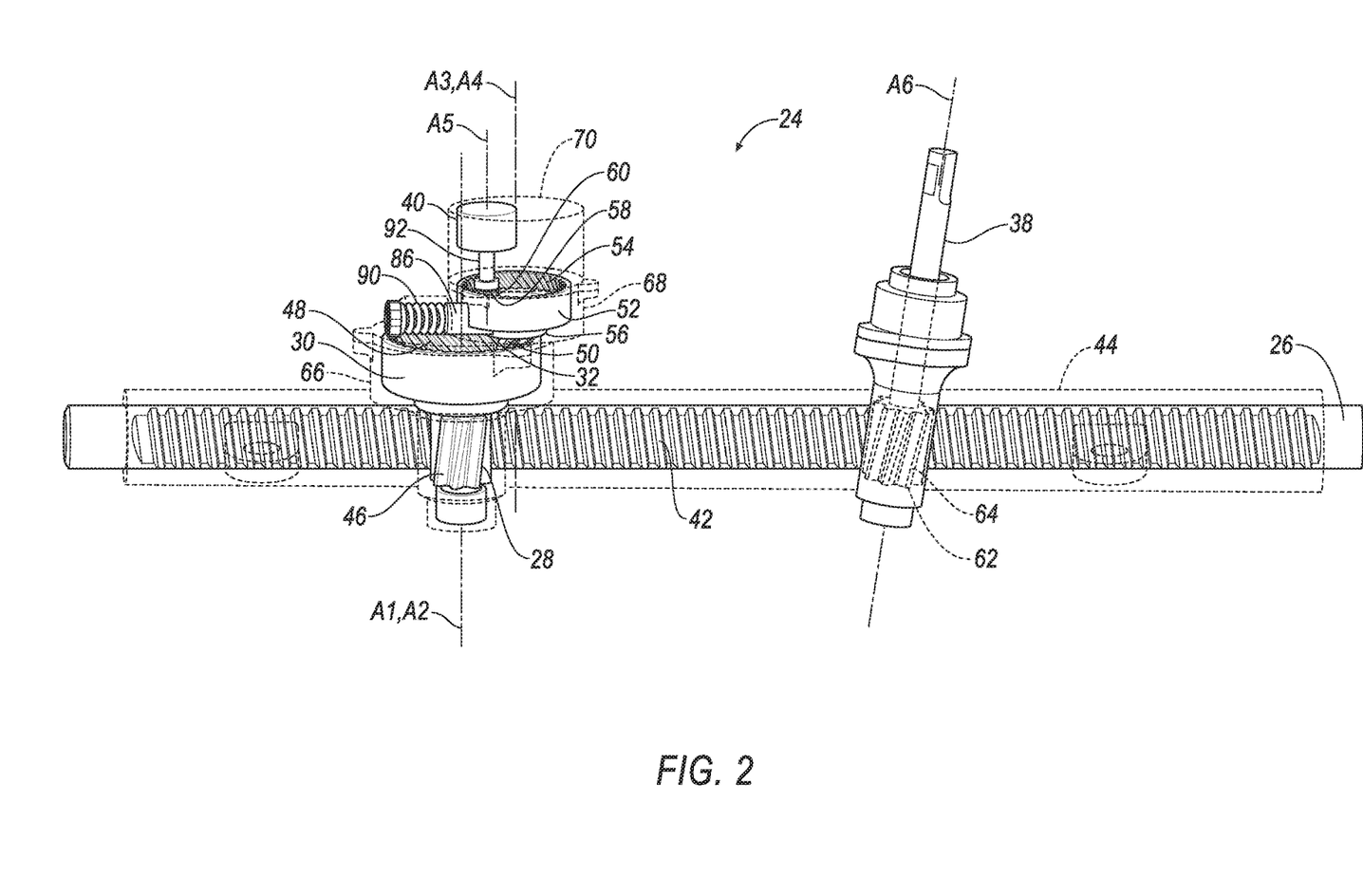
FIG. 2 is a perspective view of the steering assembly.

The steering assembly 24 may include a fourth pinion 62, shown in FIG. 2. The fourth pinion 62 includes a plurality of gear teeth 64. The gear teeth 64 extend outward, e.g., radially away from an axis A6 of the fourth pinion 62. The gear teeth may be arranged circumferentially about the fourth pinion 62, e.g., about the axis A6. The fourth pinion 62 may be rotatably supported by the housing 44 such that the fourth pinion 62 may rotate about the axis A6. The fourth pinion 62 may be spaced from the first pinion 28 along the steering rack 26.

The fourth pinion 62 may be meshed with the steering rack 26. The mesh between the fourth pinion 62 and the steering rack 26 transfers force from the fourth pinion 62 to the steering rack 26, e.g., such that rotation of the fourth pinion 62 causes movement of the steering rack 26, and vice versa. For example, the gear teeth 64 of the fourth pinion 62 may be meshed with the gear teeth 42 of the steering rack 26. Force may be transferred therebetween by the gear teeth 64 of the fourth pinion 62 contacting the gear teeth 42 of the steering rack 26.

The fourth pinion 62 may be coupled to the steering wheel 34. For example, the fourth pinion 62 may be fixed to the steering column 38, e.g., via welding, friction fit, etc., that is fixed to the steering wheel 34. Additional components may be used to couple the fourth pinion 62 to the steering wheel 34, e.g., universal joints, constant-velocity joints, an intermediary shaft, etc.

The steering assembly 24 may operate without, and may not include, the fourth pinion 62. For example, the steering assembly 24 may be a steer-by-wire assembly in which movement of the steering rack 26 is controlled solely based on commands from the computer 36, e.g., based on a detected position of the steering wheel 34 and/or steering column 38, in an autonomous mode, etc. To put it another way, the steering assembly 24 may operate without a mechanical coupling between the steering rack 26 and the steering wheel 34 and/or steering column 38 via the fourth pinion 62.

The housing 44 may support the steering rack 26, the first pinion 28, the second pinion 32, the third pinion 58, the first internal gear 30, second internal gear 52, the third pinion 58, and the fourth pinion 62. The housing 44 may be metal or any other suitable material. The housing 44 may include multiple components, e.g., a first component 66, a second component 68, and a third component 70 fixed to each other. The first component 66 may define a first chamber 72 with an open top 74. The second component 68 may define a second chamber 76 with an open top 78. The second component 68 may cover the open top 74 of the first chamber 72. The third component 70 may cover the open top 78 of the second chamber 76. The first internal gear 30 and the second pinion 32 may be in the first chamber 72. The second internal gear 52 and the third pinion 58 may be in the second chamber 76.

Figure 3:
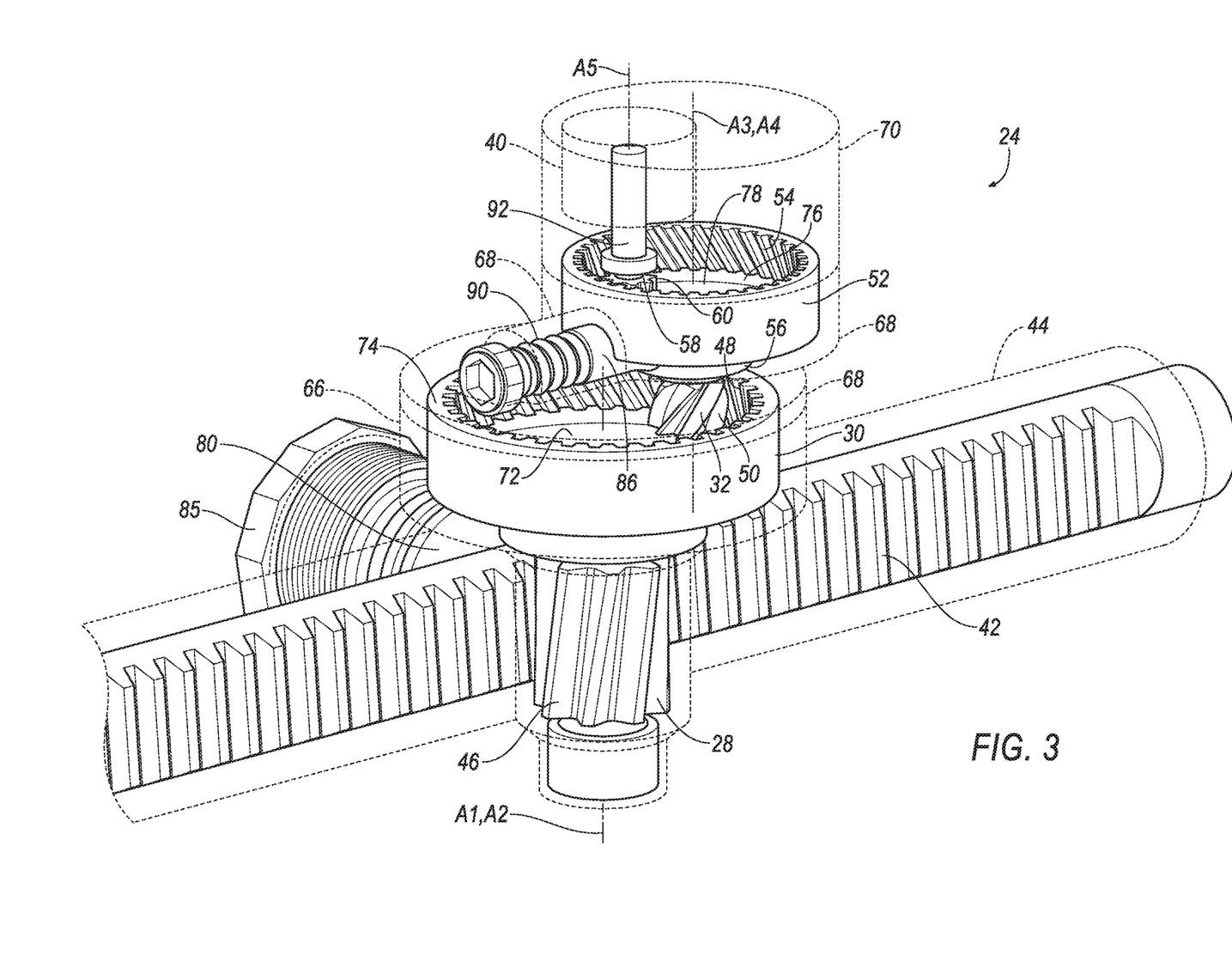
FIG. 3 is a perspective view of the steering assembly.
Figure 4:
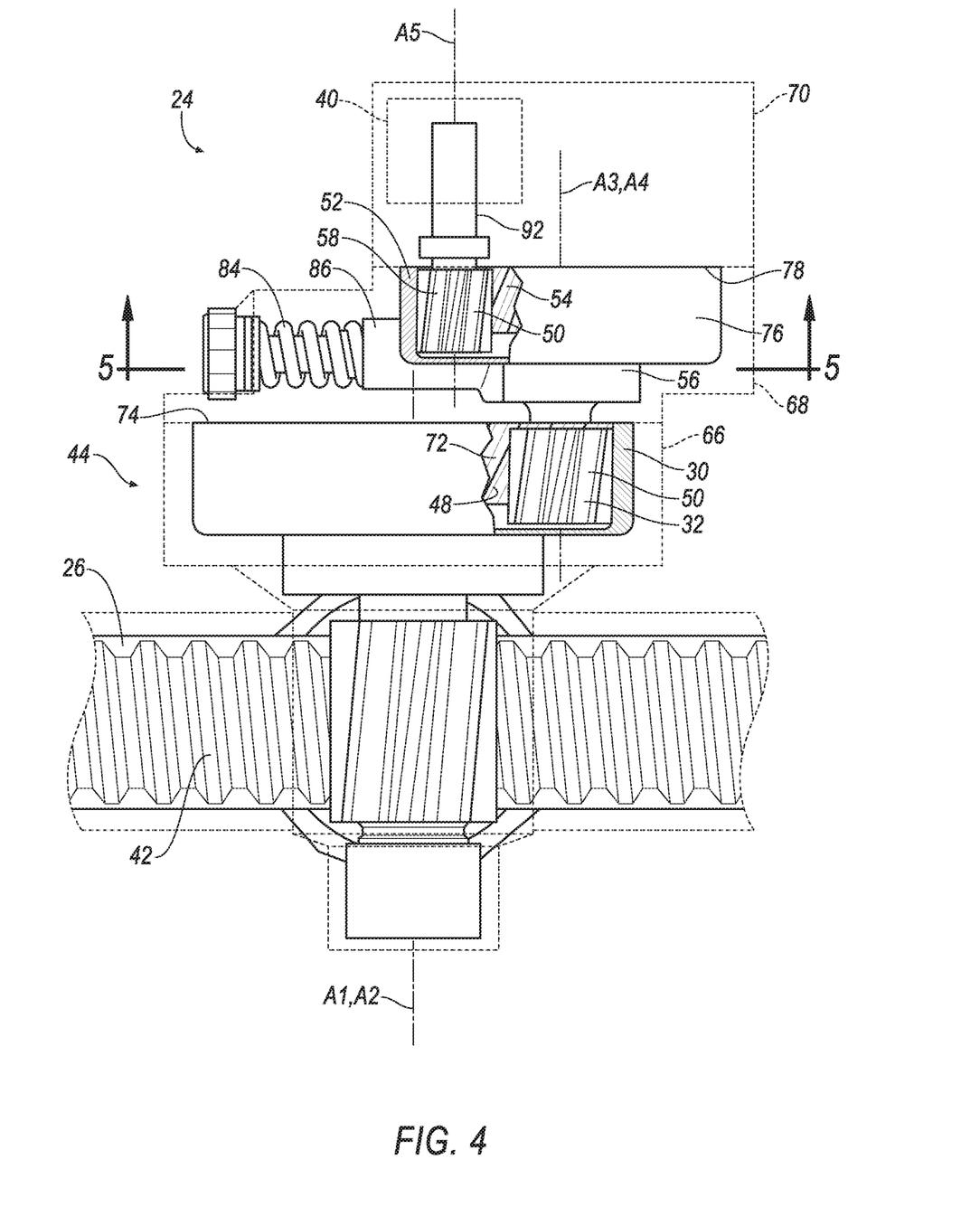
FIG. 4 is a front view of the steering assembly.
Figure 5:
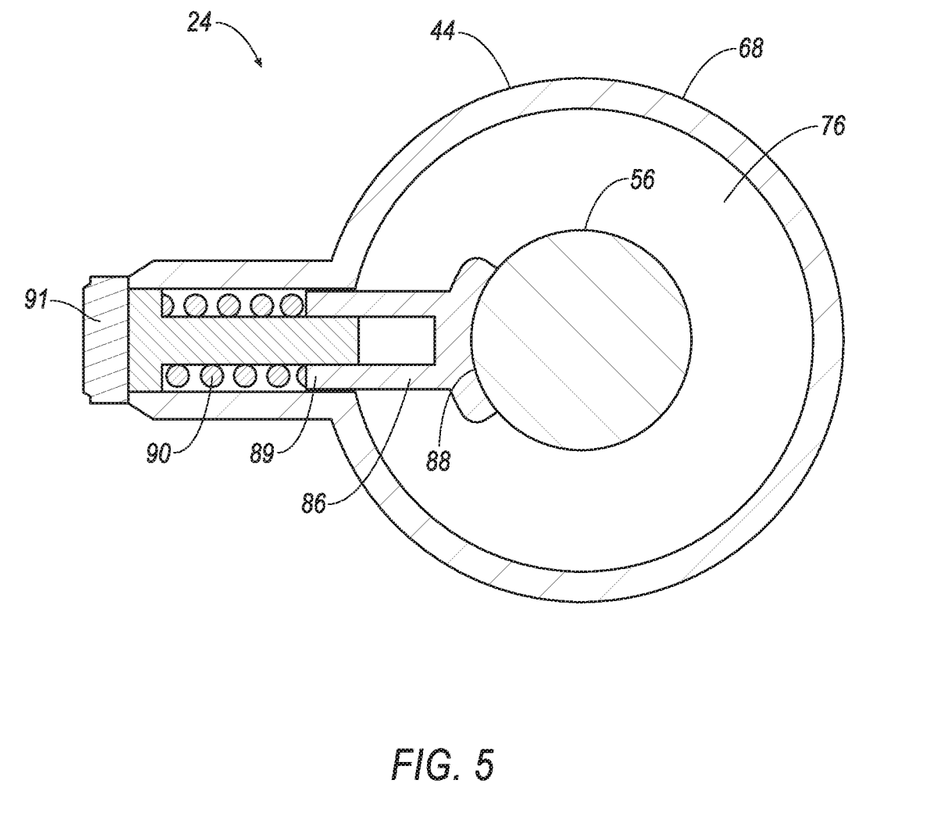
FIG. 5 is a cross section view of the steering assembly taken along 5-5 in FIG. 4.
Figure 6:
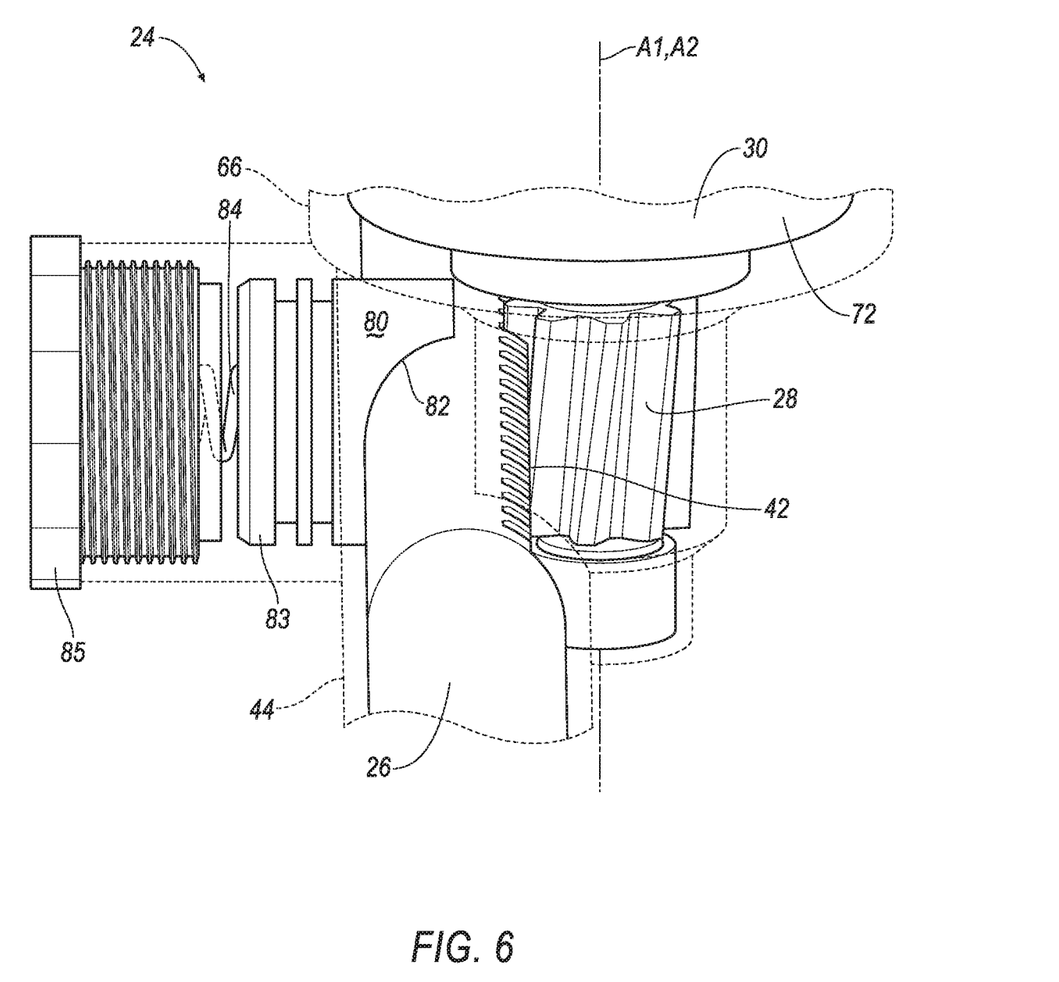
FIG. 6 is a perspective view of the steering assembly.

The steering assembly 24 may include a first yoke 80, shown in FIGS. 3 and 6. The first yoke 80 helps maintain the mesh between the steering rack 26 and the first pinion 28. The first yoke 80 may be supported by the housing 44. The first yoke 80 operatively engages the steering rack 26 opposite the first pinion 28. For example, the first yoke 80 may have a reaction surface 82 opposite a distal end 83. The reaction surface 82 may abut the steering rack 26 opposite the first pinion 28. In other words, the steering rack 26 may be between the first yoke 80 and the first pinion 28. A bearing, a bushing, or other friction reducing component may be between the reaction surface 82 and the steering rack 26.

The steering assembly 24 may include a first spring 84. The first spring 84 may be located between the first yoke 80 and the housing 44. For example, the first spring 84 may be between the distal end 83 of the first yoke 80 and a plug 85 of the housing 44. The first spring 84 urges the first yoke 80 toward the steering rack 26 and the first pinion 28. Force from the first spring 84 and first yoke 80 on the steering rack 26 urges the gear teeth 42 of the steering rack 26 and the gear teeth 46 of the first pinion 28 toward each other, e.g., into mesh with each other.

The steering assembly 24 may include a second yoke 86, shown in FIGS. 2-5. The second yoke 86 helps maintain the mesh between the first internal gear 30 and the second pinion 32, and the mesh between the second internal gear 52 and the third pinion 58. The second yoke 86 may be supported by the housing 44, e.g., by the second component 68. The second yoke 86 operatively engages the second pinion 32. For example, the second yoke 86 may be Y-shaped. The second yoke 86 has a reaction surface 88, e.g., between top portion of the Y-shape. The reaction surface 88 of the second yoke 86 may abut the circumferential surface 56 coupled to the second pinion 32 and/or second internal gear 52. A bearing, a bearing, or other friction reducing component may be between the reaction surface 82 and the circumferential surface 56.

The steering assembly 24 may include a second spring 90. The second spring 90 may be located between the second yoke 86 and the housing 44. For example, the second spring 90 may be between a bottom portion 89 of the Y-shape of the second yoke 86 and a second plug 91 of the housing 44. The second spring 90 and second yoke 86 may be designed to urge the second pinion 32 into mesh with the first internal gear 30. For example, the second spring 90 may urge the second yoke 86 toward the second pinion 32 opposite where the second pinion 32 is meshed with the first internal gear 30. The second spring 90 and second yoke 86 may be designed to urge the second internal gear 52 into mesh with the third pinion 58. In other words, force from the second spring 90 may be transferred to the second pinion 32 and the second internal gear 52 via the second yolk and the circumferential surface 56. The force may urge the gear teeth 50 of the second pinion 32 toward the gear teeth 48 of the first internal gear 30, and urge the gear teeth 54 of the second internal gear 52 toward the gear teeth 60 of the third pinion 58.

The steering assembly 24 may include the motor 40. The motor 40 may be an electric motor, or any suitable type. The motor 40 is engaged with the first pinion 28 to transfer torque therebetween. To put it another way, rotation of a shaft 92 of the motor 40 causes rotation of the first pinion 28, and vice versa. For example, the shaft 92 of the motor 40 may be fixed relative to the third pinion 58 such that rotation of the shaft 92 causes rotation of the third pinion 58. For example, the third pinion 58 may be fixed to the shaft via a set-screw or other fastener, welding, mechanical interlock, e.g., splines, keyed slots, etc. Torque and/or rotation applied to the third pinion 58 from the shaft 92 may be transferred to the first pinion 28 via the gears 30, 32, 52. Additional components than described, such as additional shafts, gears, etc., may engage the motor 40 with the first pinion 28. Fewer components than described may engage the motor 40 with the first pinion 28, e.g., the shaft 92 may be fixed to the second pinion 32.

Figure 7:
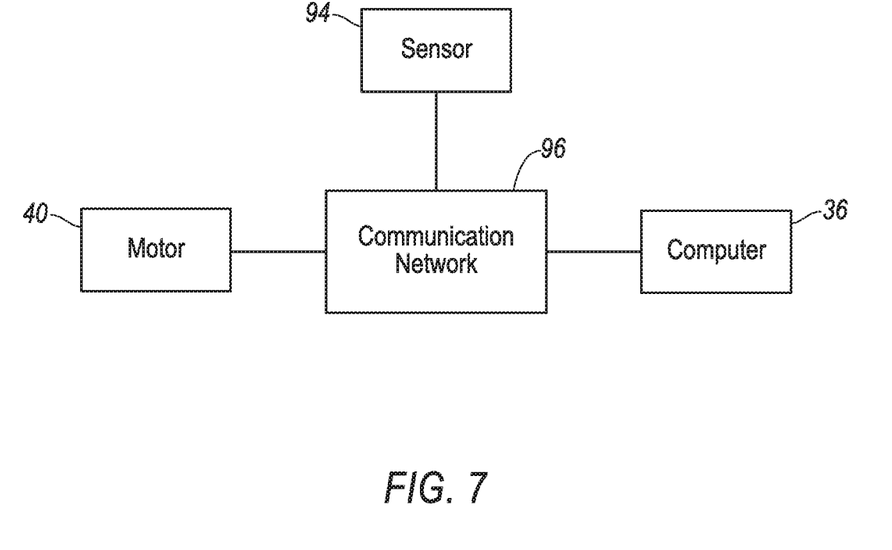
FIG. 7 is a block diagram of components of the vehicle.

The steering assembly 24 may include a sensor 94, shown in FIG. 7, designed to detect a rotational position of the steering column 38, e.g., a proximity sensor, a hall effect sensor, a rotational transducer, a potentiometer, etc.

A communication network 96 may facilitate wired or wireless communication among the components of the steering assembly 24, e.g., the computer 36, the motor 40, the sensor 94, etc. The communication network 96 includes hardware, such as a communication bus, for facilitating communication among the components. The communication network 96 may facilitate wired or wireless communication among the components in accordance with a number of communication protocols such as controller area network (CAN), Ethernet, WiFi, Local Interconnect Network (LIN), and/or other wired or wireless mechanisms.

The computer 36 may be a microprocessor-based controller implemented via circuits, chips, or other electronic components. For example, the computer 36 may include a processor, memory, etc. The memory of the computer 36 may include memory for storing instructions executable by the processor as well as for electronically storing data and/or databases. Although one computer is shown in FIG. 7 for ease of illustration, it is to be understood that the computer 36 could include, and various operations described herein could be carried out by, one or more computing devices.

The memory of the computer 36 stores instructions executable by the processor to actuate the motor to control the steering angle A of the wheels 22 based on a detected position, e.g., a rotational position, of the steering wheel 34. For example, the computer 36 may receive information via the communication network 96 from the sensor 94 indicating the detected position of the steering column 38 fixed to the steering wheel 34. Based on the detected position of the steering wheel 34, the computer 36 may transmit an instruction to the motor 40 indicating a rotational direction, an amount of rotation, etc., for the motor 40 to provide to the shaft 92. For example, when the detected position indicates that the steering wheel 34 and steering column 38 have been turned to a certain position or in a certain direction, the computer 36 may actuate the motor 40 to move the steering rack 26 and change the steering angle A to correspond to the detected position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a steering rack;
   a first pinion meshed with the steering rack;
   a first internal gear coupled to the first pinion;
   a second pinion meshed with the first internal gear;
   a second internal gear coupled to the second pinion; and
   a third pinion meshed with the second internal gear.

2. The assembly of claim 1, wherein the first pinion is fixed relative to the first internal gear.

3. The assembly of claim 1, wherein the first pinion and the first internal gear are monolithic.

4. The assembly of claim 1, further including a motor engaged with the first pinion.

5. The assembly of claim 1, further including a yoke operatively engaging the steering rack opposite the first pinion, and a spring urging the yoke toward the steering rack and the first pinion.

6. The assembly of claim 1, further including a housing supporting the steering rack, the first pinion, the first internal gear, and the second pinion.

7. The assembly of claim 1, wherein the second pinion and the second internal gear are monolithic.

8. The assembly of claim 1, further including a yoke operatively engaging the second pinion, and a spring urging the yoke toward the second pinion opposite where the second pinion is meshed with the first internal gear.

9. The assembly of claim 8, further including a circumferential surface between the second pinion and the second internal gear, the yoke abutting the circumferential surface.

10. The assembly of claim 8, wherein the spring and the yoke are designed to urge the second internal gear into mesh with the third pinion.

11. The assembly of claim 1, further including a housing supporting the steering rack, the first pinion, the first internal gear, the second pinion, the second internal gear, and the third pinion.

12. The assembly of claim 1, further including a fourth pinion meshed with the steering rack.

13. A vehicle, comprising:
   a pair of wheels;
   a steering rack designed to control a steering angle of the wheels;
   a first pinion meshed with the steering rack;
   a first internal gear coupled to the first pinion;
   a second pinion meshed with the first internal gear;
   a second internal gear coupled to the second pinion; and
   a third pinion meshed with the second internal gear.

14. The vehicle of claim 13, wherein the first internal gear is above the steering rack.

15. The vehicle of claim 13, further including a steering wheel, a motor engaged with the first pinion, and a processor and a memory storing instructions executable by the processor to actuate the motor to control the steering angle of the wheels based on a detected position of the steering wheel.

16. The vehicle of claim 13, further including a fourth pinion meshed with the steering rack, and a steering wheel coupled to the third pinion.

17. The vehicle of claim 13, further including a yoke operatively engaging the second pinion, and a spring urging the yoke toward the second pinion opposite where the second pinion is meshed with the first internal gear.

18. The vehicle of claim 13, wherein the first pinion and the first internal gear are monolithic.

* * * * *